United States Patent
Philhower et al.

(10) Patent No.: US 9,273,841 B2
(45) Date of Patent: Mar. 1, 2016

(54) SOLAR POWERED GROUND LIGHT

(71) Applicant: Herman N. Philhower, as Trustee of the H N Philhower Family Trust (last dated October 31, 2012), Cypress, CA (US)

(72) Inventors: Herman N. Philhower, Cypress, CA (US); Robin Charles Adair, Huntington Beach, CA (US)

(73) Assignee: Herman N. Philhower, Cypress, CA (US), as Trustee of the H N Philhower Family Trust Last Dated 10/31/12

( * ) Notice: Subject to any disclaimer, the term of this patent is extended or adjusted under 35 U.S.C. 154(b) by 0 days.

(21) Appl. No.: 14/873,163

(22) Filed: Oct. 1, 2015

(65) Prior Publication Data

US 2016/0025287 A1    Jan. 28, 2016

Related U.S. Application Data

(63) Continuation-in-part of application No. 14/155,157, filed on Jan. 14, 2014, now Pat. No. 9,175,821, which is a continuation of application No. 61/760,617, filed on Feb. 4, 2013.

(51) Int. Cl.
| | |
|---|---|
| *F21V 23/04* | (2006.01) |
| *F21S 9/03* | (2006.01) |
| *F21S 8/02* | (2006.01) |

(52) U.S. Cl.
CPC . *F21S 9/037* (2013.01); *F21S 8/022* (2013.01)

(58) Field of Classification Search
CPC ............ F21S 8/022; F21S 9/037; F21S 31/00
USPC ............ 362/153, 153.1, 183, 249.02, 249.05, 362/267, 276, 802
See application file for complete search history.

(56) References Cited

U.S. PATENT DOCUMENTS

| | | |
|---|---|---|
| 4,907,139 A | 3/1990 | Quiogue |
| 5,255,170 A | 10/1993 | Plamp et al. |
| 7,021,787 B1 | 4/2006 | Kuelbs |
| 2008/0232094 A1 | 9/2008 | Ramsdell |
| 2013/0141901 A1 | 6/2013 | Martzall |

*Primary Examiner* — Jason Moon Han
(74) *Attorney, Agent, or Firm* — Curtis L. Harrington; Harrington & Harrington

(57) ABSTRACT

A solar powered ground lights is typically mounted in a walkway, pathway, pool deck, roadway, park pathway, either in cement, wood, synthetic materials, or otherwise, and are ideally suited for use in walkways, walls, ceilings, and pool or dock areas because they are readily mounted from the top, requiring only a cylindrical depression and possibly three screws for mounting and require no external wiring. The solar powered ground lights are LED or electro-illuminescent or similar type, supported close to a lens for a good low angle view factor and are low voltage and safe. A solar panel recharges the battery. The system may be fully IP68 waterproof rated.

10 Claims, 8 Drawing Sheets

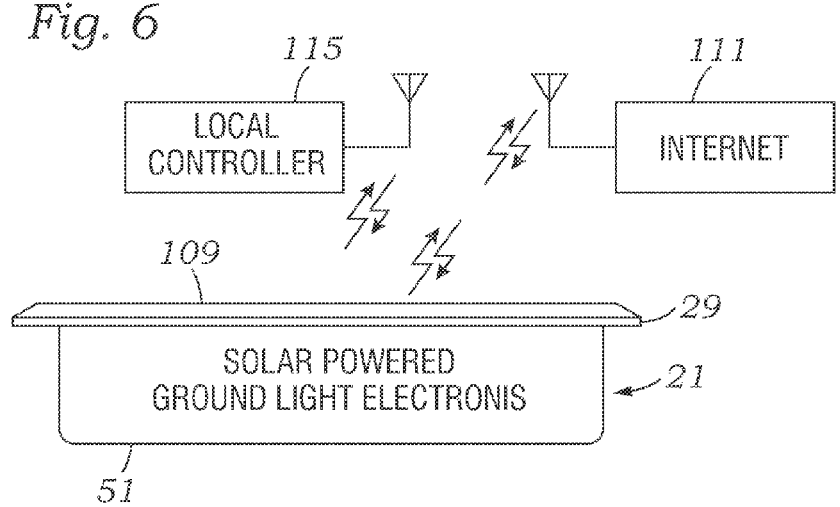
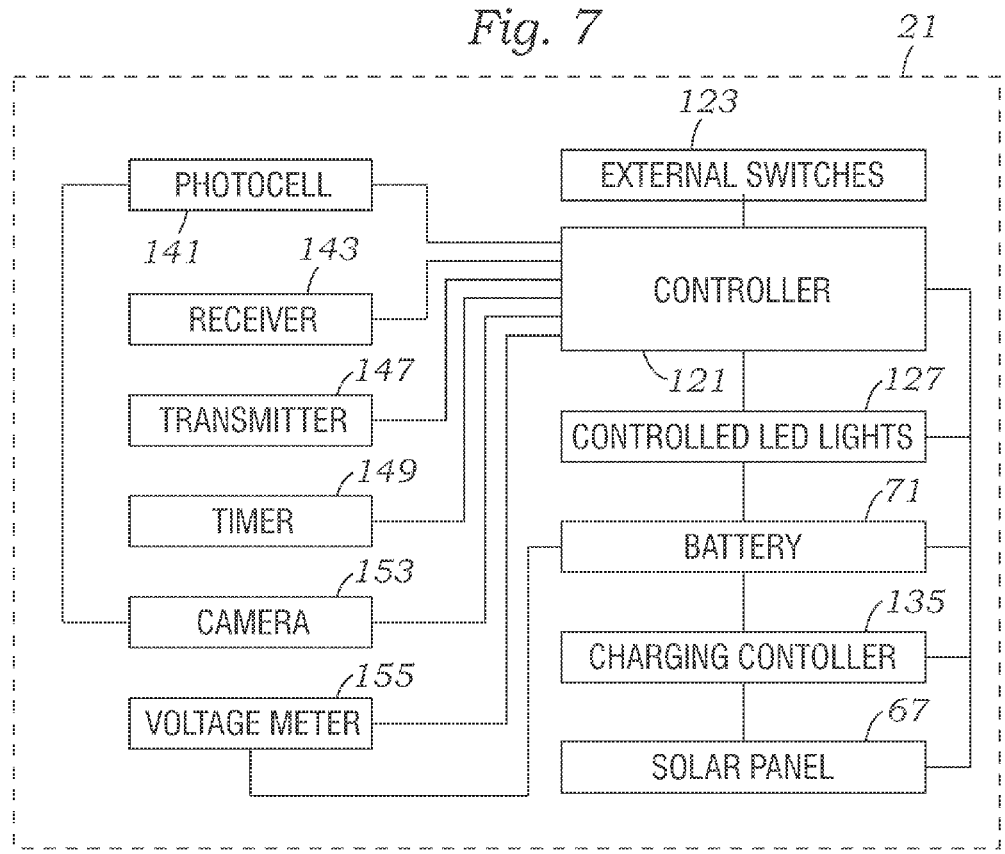

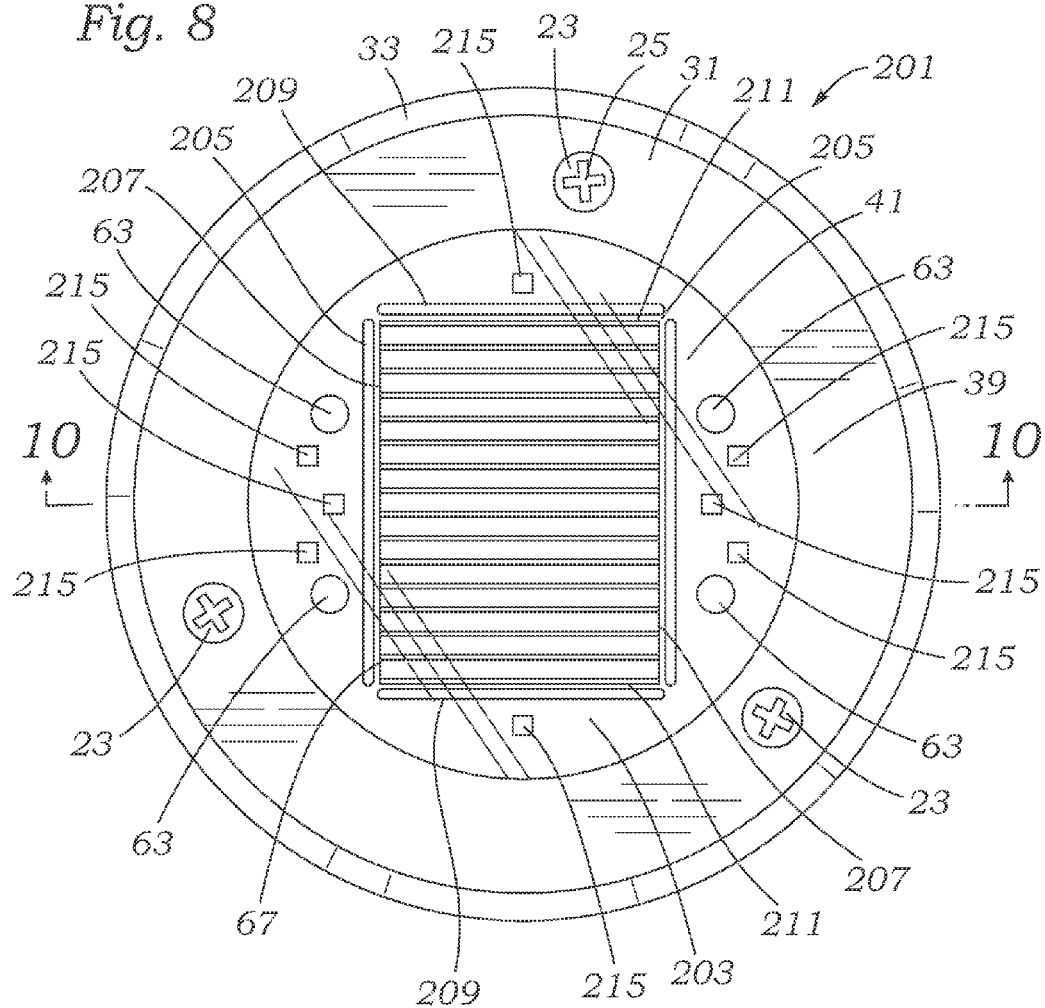

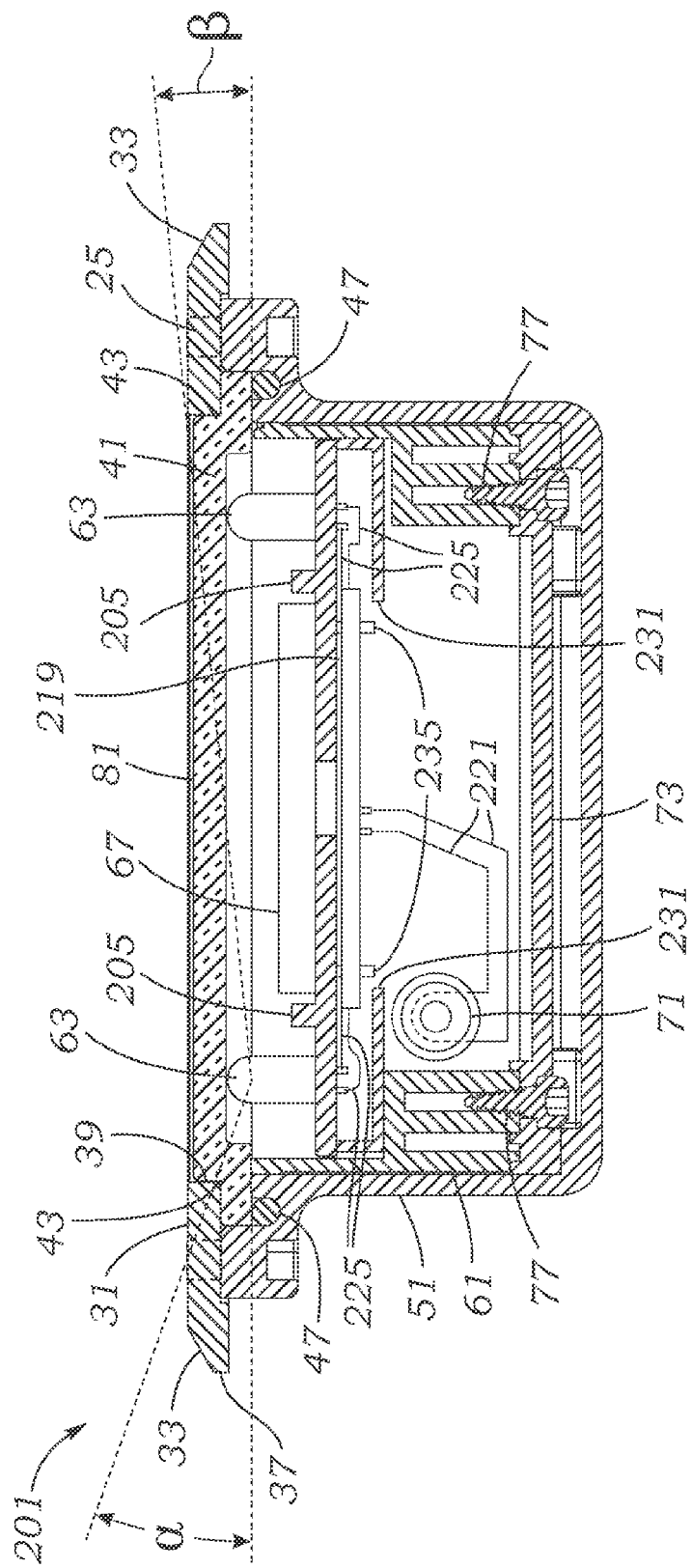

SOLAR POWERED GROUND LIGHT

Continuation-In-Part of co-pending U.S. non-provisional patent application Ser. No. 14/155,157 filed Jan. 14, 2014, which was a continuation of then Provisional Patent No. 61/760,617 filed Feb. 4, 2013.

FIELD OF THE INVENTION

The present invention relates to improvements in the field of ground mounted support structures for providing stable support and for providing illumination in a manner that is low maintenance and with automatic operational service, and especially lights which are ground, dock, deck, boat deck and walk mounted which will provide passive and low maintenance illumination by providing a constant night time illumination without the need for wiring, especially in a harsh marine environment and with due consideration given to the view factor relating to lateral illumination where a flat profile horizontally mounted lighting structure is provided.

BACKGROUND OF THE INVENTION

In-ground or in-deck support is not utilized enough to provide passive lighting. Some types of ground lighting are known for gardens and which is supported on short pikes to give a high lighting effect with lateral light directed upon plants and garden areas. These types of lighting are inappropriate for high traffic areas where the object of providing lighting and being not significantly obstructive to walking is desired.

Conversely, walkways, parkways, roads, and the like are typically conventionally illuminated utilizing lighting systems that require wiring from one illuminated source to the next, such as overhead wiring or poles. Some illumination systems are solar powered and temporary with housing that are thrust into the ground with a steak and are not capable of being mounted into a surface or mounted to as to permit and illuminate pedestrian traffic. Another issue for pedestrian traffic is wear. Many custom wired in-sidewalk systems have painted plates which scuff and undergo the negative effects of sunlight destruction (fading) as well as heating and cooling.

Many potentially dangerous places to walk are not lighted because the expense of wiring and providing lighting in places not heavily frequented by pedestrians is not believed to be justified. Docks and areas surrounding docking areas may go days and weeks without foot traffic in the area. However, in a harbor environment lighting is critical because visibility, especially when it is needed, is frequently impaired by weather conditions and stored obstacles, such as carts, rope, floats paddles and small canoes on a dock.

A requirement of high maintenance is a cost issue which adds to the installation cost issue for all ground lighting, but especially lighting units mounted in the marine environment. The electrical distribution system has to be sufficiently upgraded over a system that would exist outside the marine environment and at increased cost. Failure of any distribution system in a marine environment occurs more frequently and at a higher cost of replacement. Maintenance of wired units requires much onsite time to dis-assemble, replace faulty components and then re-assemble on site.

Low power lighting has been effective for signs giving direct illumination to the viewer, and for some closely related reflective service where a structure is illuminated, typically a short distance from the light source. Attempts to provide usable, effective illumination for a low-height ground fixture having a passive solar light source have been challenging.

Most walkway lighting involves custom raised installations with light being deliberately reflected from provided structures or with light being directed downward to a surface that is expected to be in a defined and known location and have known characteristics. A good example of the latter includes stairs where each stair is illuminated from above.

Other instances include high power lights that are directed and focused upwardly are those used to illuminate improvements to real estate including buildings, walls, signs and landscaping. Except for landscaping, the aforementioned illumination is often high power. Illumination of landscaping still falls in the decorative category as most are illuminated from positions that are distanced from walkways. Illumination of landscaping on a smaller home scale may be low power solar and is also located away from walk ways, but is also most often downwardly directed. Where low power solar lighting is downwardly directed, and where the height of the light source is known, it may be more certain to be able to specify the distribution of light needed. Lighting that is not for direct viewing of the light source (decorative), and which is not for illuminating a known target, even under low power conditions, has to be designed with a higher level of expected usage variability than other applications with fixed parameters.

What is needed is a low maintenance lighting system, utilizable in a relatively low pedestrian traffic environment, that is inexpensive to install, inexpensive to replace (and/or repair), and which has wear characteristics that will not exhibit significantly noticeable wear if trod upon. The needed system should be available at a range of costs and capabilities to encourage the installation of a low-tech version of the system in facilities which demand the lowest cost system, and to encourage the installation of a high-tech version of the system in facilities which demand a higher level of service & control.

For a horizontal mounted, upwardly directed lighting system fixture the need for a controlled lateral light projection can be significant. What is needed is a light fixture that can provide significant, even, lateral illumination and can consequently act as both a highly visible low power light source at a distance, as well as to provide illumination of surrounding structures near the light installation, including overhead structures and lateral structures. A needed system should have the capability for illumination at a wide angle, if desired, while maintaining a low height profile. Further, it would be preferable that lighting have a capability for users and installers to specify locations in a low height support where lights could be positioned in order enable user specifiability of a predominant direction for a lighting view factor. Any structure which also enabled placement of lights as close to an upper protective transmissive surface is needed.

SUMMARY OF THE INVENTION

The present invention provides for an illuminated solar powered ground light that has a number of advantages over conventional low profile low power lighting systems. Ground, in the context of the solar powered ground light, may also mean any surface to which the Solar powered ground light may be mounted, including vertical walls. However, much of the advantages built in to an improved horizontally mounted and upwardly directed lighting structure herein are important. The ground need not be a walk way, but the light of the invention is built to withstand foot traffic on its mounting surface. This surface may be known as a pathway, a deck, a dock, a road surface, a wall, a ceiling, a roof, a boat deck, or any surface capable of supporting the insertion and/or attachment of the solar powered ground light. The solar powered ground light may thus be mounted above, below, or to the side or other surface relative to the ground. The solar powered ground light may even be mounted underwater in a swimming pool, as it is preferable that the solar powered ground light may be IP-67 rated or better.

The solar powered ground light may of the invention preferably include an IP68, or better, waterproof rated solar powered lighting system utilizing light emitting diodes (LEDs) or an electro-luminescent (EL) display utilizing a top mounted robust lens for specified light emission. A solar powered battery charging system to support the LEDs may also include a photocell system to provide for turning on and off the lighting source based on the ambient lighting conditions.

Various aspects of the solar powered ground light of the invention may be realized. A solar powered ground light may provide a structure to readily mount in a low height fashion as possible to a surface as possible utilizing a simple cylindrical recess for mounting the solar powered ground light from an upper position and into and through the surface of a flat member, preferably a walk way. A solar powered ground light may provide a capability to select and operably manipulate LED colors and or blink rates of selected lighting sources contained within the solar powered ground light. A provision may be made within the solar powered ground light that provides a warning of potential danger and indicates the location of the pathway to be taken by pedestrians in poor lighting conditions.

The solar powered ground light system may include a fixture having a mounting ring and an aluminum housing and a plastic inner housing including supports and connections for a solar array having a lens coupled to a plastic housing to define a space for a solar lighting device and battery system where the mounting ring and photo cell lens is positioned to emit light from the top opening and is coupled with a top surface of the photo cell lens so that a light-emitting surface of the solar lighting device is exposed at the opening to provide light.

The solar powered ground light is preferably of the type that may be attached to nearly any surface, horizontal, vertical, above ground, or under water. Therefore, it can be appreciated that the solar powered ground light would be beneficial in a waterfront application. The solar powered ground light may further disclose a waterproof Solar powered ground light that may feature a triggering photocell to turn the waterproof Solar powered ground lights on and off based on ambient lighting conditions, as well as other maintenance, light control and telemetry capability.

A circuit may be provided that allows a user to turn the waterproof solar powered ground light on and off utilizing a recessed slide switch, a magnetically activated switch, or the like, to change the color of the light, to invoke a blinking function or to invoke an emergency signal function. A preferred embodiment of the waterproof solar powered ground light provides for a system fabricated out of aluminum, although other materials may be utilized, such as die cast aluminum, cast iron, brass, stainless steel, as well as a high strength injection moldable plastic such as Nylon with a fiberglass fill element. The solar powered ground light may provide for the use of readily accessible mounting screws around a ring, both screws and ring of sufficient length to mount to nearly any surface securely.

The present invention provides for an illuminated solar powered ground light that has a number of advantages over conventional non-solar powered ground lights such as those ground lights which are specially installed and wired for energization by the power mains. First, by eliminating the need to connect to power mains, a corresponding savings is experienced by eliminating the need to provide shielded access to power distribution under harsh environmental (exposure to moisture and salt) conditions, as well as the savings associated with the provision of through-the-dock wiring access which involves drilling multiple under-dock holes for shielded wiring runs and placement of support fittings, junction boxes and aligning access to other energy consumptive services.

Second, by providing a self-contained solar powered ground light with sturdy mounting structure, the solar powered ground light is preferably easily removable from its location and replaced by another solar powered ground light unit so as to enable any trouble-shooting of a unit to be performed off site, at substantial savings of money and manpower. The use of a mechanical screwdriver will permit the solar powered ground light to be changed out and replaced in under one minute. Security against vandals and thieves can be provided by securing the solar powered ground light structure with fasteners which range from ordinary screw driver operated threaded members to unusual engagement and locking members requiring special tools, especially in large-scale facilities.

Third, the self contained solar powered ground light structure is sealed against the environment. Because it can be manufactured in a controlled, off-site environment, it can have a greater assurance of being sealed (especially by having available testing machinery). The risk of field service inconsistencies in environmental sealing are well known and assured control of sealing is cost-sensitive. Further, where the self contained solar powered ground light has communications capabilities, any monitoring or checking or diagnostic polling can be performed without the need to access the sealed unit.

Fourth, a solar cell and light emitting diode support is provided that has a central area surrounded by walls matching the shape of the solar cell and that has light emitting diode support apertures that permit mounting the light emitting diodes at locations about the periphery of the solar cell. Where the light emitting diodes are provided with sufficient leads, they may be located by the user. In the alternative, they may be configured by the manufacturer. The light emitting diode support may have an underside configured to assist in supporting the circuit board, so that the combination of supported solar cell & LEDs, the support and the circuit board can provided and available as one unit ready to connect to a battery such as a rechargeable battery. Such an integrated support will reduce change-out time for repairs and circuit upgrades.

In terms of view factor, and particularly when working with LEDs that are not electronically controllable to specify individual illumination in different directions, the ability to pre-specify the lighting configuration and/or the ability to dynamically change the configuration of illuminated and non illuminated LEDs within the solar powered ground light can prove advantageous. As an example, an LED at the center of a flat surface has the ability to create a cone of illumination limited by the angle at which a non light transmissive surface intersects with the lowermost or outermost portion in a straight line relationship of the illuminated surface of the LED. Where the LED may be located farther away from the center and closer to one edge, the minimum height of transmission in the direction of the side in which the center LED is shifted rises, and the minimum height of transmission in the direction of the side in which the center LED was shifted away from, lowers.

One illustrated embodiment of the invention illustrates an organizing support having a configuration in which each LED lies generally to the outside of two of four abbreviated height walls that laterally stabilize and limit movement of a rectangular solar panel. The solar panel as one example includes two pairs of LEDs along the walls of greater length. For higher spacing, each of the LEDs is placed at a position of about 25% from the ends of the wall that the LEDs lie outwardly adjacent. This distance provides separation of each pair of LEDs to the outside of the wall, yet is not so far as to require a smaller rectangular solar panel to provide clearance at the corners of the solar panels and the ends of the walls. Service apertures could also be placed outside the shorter walls that oppose and stabilize the ends of the solar panel solar panel.

The organizing support also assists the elevation of the LEDs to a position against an upper translucent lens to create a higher view factor through which the light from the LEDs are transmitted outside the solar powered ground light. Improvement of height mounting of the LEDs translates into a lower angle of light transmission. Provision of LEDs that are mounted in a spaced apart relationship from a center of a circular horizontally mounted solar powered ground light will produce a radially uneven view angle that has a lower minimum with respect to the side from it is moved away from and higher minimum viewing angle with respect to the side it is moved toward, assuming no other internal obstruction.

The ability to adjust viewing angle is accomplished with three opportunities. The first opportunity occurs at formation of the organizing support by specifying the number and position of both the solar panel and LEDs, as well as the provision of mounting apertures through which a user can change the position of the LEDs. The second opportunity occurs at installation where a user can adjust the location of the LEDs by plugging and movement or by providing connection lines long enough to be moved into one or more apertures provided in excess of the number of LEDs. As an example, a organizing support with 4 LEDs could be mounted on one side of the organizing support where it is known that a predominant viewing direction will always require a minimum viewing angle. The third ability adjust a viewing angle is by selectively controlling the LEDs to selectively illuminate the LED having the most optimum viewing angle for the conditions desired.

In general a self contained nature of the solar powered ground light enables advantages for a facility in ease of both technology upgrading and user function differentiation. For example, in a large dock facility, the same types of solar powered ground lights can be changed out in groups to allow for keeping only a small inventory of replacement solar powered ground lights which can either be repaired on site or shipped offsite for repair. In the case where upgrading of all solar powered ground lights is desired, all solar powered ground lights can be replaced with new ones with the replaced solar powered ground lights either refurbished, upgraded, and or sold on the secondary market to another facility. In addition, where an owner or manager decides that solar powered ground light longer needed, the solar powered ground light may simply be removed and the space it once occupied may be filled in with a filler material or with a plug.

Differentiation is possible such as where it is desired to replace every other solar powered ground light is a different color, or to place solar powered ground lights having additional capability at different locations interspersed in between other solar powered ground lights to cause some solar powered ground lights to have different functions. Some of those functions might include signaling from solar powered ground light or to the solar powered ground light. Such signaling could be either initiated or limited or restricted using a central communication station.

The examples of the reasons and types of communication and signaling are endless. A central station may be used to changed the light color of several solar powered ground light solar powered ground lights along a siding where a boat may have obtained permission to dock, or in front of a restaurant that is running a special, etc. In another instance a series of lights may be made to flash where the renter needs to contact the landlord or other authority, or vice versa. Special flashing sequences may be used at night to silently or with audio, signal time such as some flashing at times similar to those of a bell tower clock.

Control need not be had exclusively from a central station but can be shared with local devices such as an I-phone. A boat owner or other premises renter may have the ability to, either through a central system or through a local wireless control, turn his illuminated solar powered ground lights on or off. Control through a central system may partially include a link through the internet. In addition, the self contained solar powered modular structures can be enabled to communicate with each other. For example, a catastrophic failure in a unit such as complete destruction by a heavy piece of equipment, would not result in an ability of other units to report its absent status. An adjacent solar powered ground light unit might report a failure, especially if the solar powered solar powered ground light units were set to communicate with each other more often than a central station.

The "drop in" accommodating nature of the solar powered ground light structure enables quick upgrade to a wide variety of other physical variations. For some solar powered ground lights it may be desirable to have a taller and brighter light source under certain circumstances, such as special events or where specialized structures are needed to be placed over the solar powered ground light locations (such as a light retransmissive cone, or for which a higher profile structure is acceptable). The interchange of one solar powered modular structure for another, such as the self contained solar powered modular structure being interchanged for any other structure, may be preferably performed by unfastening and refastening a threaded members, or by removal of a retaining ring. The change-out can be performed with an electric rotary tool, such as an electric screwdriver, in a few seconds.

In terms of the nature and quality of the light produced, as well as the time of duration during which lighting is activated, the solar powered ground light can either be pre-set with a timer or controlled remotely to turn on and off at different times as well as to receive instructions remotely to reset the timer. A timer may set itself from the passing of a threshold level of light and dark, and it might also determine the intensity and color of light which is displayed. By example only, a self contained solar powered modular structure might be set to start its timer at dusk and to thereafter burn brightly with a white light until midnight, and then dim itself and switch to a red light illumination at midnight.

The individualized programming can be done by electromagnetic or optical signal through the self contained solar powered modular structure to optimize in accord with the needs of the facility. The control of the cycle and illumination needs of the pedestrian adjacent facility provides for a measure of safety and convenience. For example, docks and piers are potentially dangerous places to walk because of reduced visibility. Containers, equipment, cargo, ropes, chains and other items are deposited on piers further making walking on dark piers dangerous. The edge or edges of a pier are often where boat solar powered ground lights are mounted and these areas are usually free of obstructions that could hinder access to or from a watercraft or that could prevent people from falling into the water. The Solar Powered Illuminated Boat Solar powered ground light of the invention provides ease of locating the edge of the dock or pier and provides a measure of safety for pedestrians in the boat harbor as well as within the boat.

Boat solar powered ground lights are attached to the edges of both piers and decks to receive lines and secure watercraft to piers. Because these solar powered ground lights are typically on the edge of piers as well at other watercraft, which by design are adjacent to the water, they are convenient for indicating a location relative to the water as well as potential danger to pedestrians.

During daylight hours and periods of good visibility, solar powered ground lights physical presence are easy to see even when turned off. These structures are attractive, decorative, and clearly indicate the expected location of paths or boundaries. During periods of darkness and periods of poor visibility it is difficult or even impossible to see the path or objects in the area, the solar powered ground lights will afford a much needed light reference. When lighting cannot be used, a person could wander off the path and trip and fall. A solar powered illuminated ground light system provides for easy visibility to address the concerns for safety and providing an easy way to determine the location of the clear path with light.

Other advantages include: (1) the solar powered illuminated ground light can continue to be lighted, even over shorter periods where it is limited by its energy storage capacity; (2) can be easily found when at night; (3) can be used for fanciful decoration for ground and walls, such where it installed with colorful LED capability; (4) it also can be used as a warning light in danger areas; (5) it can be installed with yellow LEDs and given the capability to flash, not only for a warning but also to reduce duty cycle and (6) it's an environmentally friendly product, requiring no expenditure on power resources, as the solar powered illuminated ground light just gets its power from sun.

A preferred embodiment of the solar powered illuminated ground light is waterproof and also preferably of any type that may be attached to the deck of a boat or other watercraft or any object which is desired to be illuminated and seen. From the discussions above it can be appreciated that an illuminated ground light would be beneficial as mounted on watercraft and would enable much more sophisticated communications control onboard a vessel.

BRIEF DESCRIPTION OF THE DRAWINGS

The invention, its configuration, construction, and operation will be best further described in the following detailed description, taken in conjunction with the accompanying drawings in which:

FIG. 6 is a block diagram illustrating one possible realization of the relationship between a communicating solar powered ground light and a wireless connection to the internet as well as a wireless connection to a local controller;

FIG. 7 is a block diagram illustrating one possible realization of the internal circuitry within the solar powered ground light to include a light controller connected to controlled lights, battery, charging controller and solar panel, and also connected to a photocell, receiver, transmitter, timer and voltage meter, with the voltage meter also being connected to the battery.

FIG. 8 is a plan view looking down upon a further, second embodiment of a solar powered ground light having a central rectangular shaped solar cell supported by an organizing support, with the organizing support providing spaced support for four light emitting diodes;

FIG. 10 is a sectional view, similar to that seen in FIG. 3, and illustrating an organizing support having walls for containing the a centrally located solar cell, providing a number of peripheral mounting apertures for multiple LEDs, and for providing either flexible connection or plugged leads for facilitating re-location of LEDs.

DETAILED DESCRIPTION OF THE PREFERRED EMBODIMENT

Figure 1:
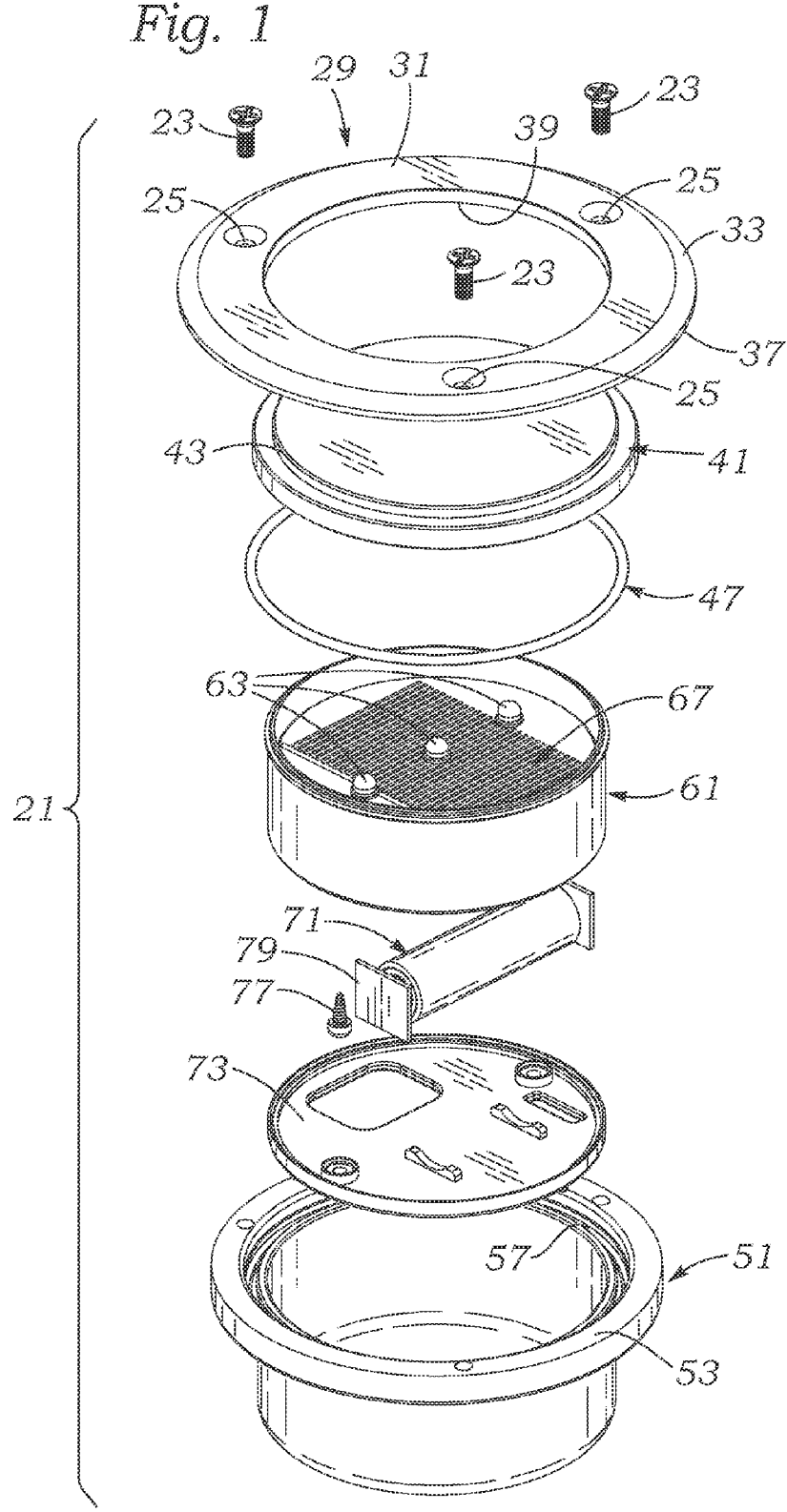
FIG. 1 is an exploded view looking down into the solar powered ground light of the invention.

Referring to FIG. 1, a plan view looking into a solar powered ground light 21 of the invention illustrates the interfitting and spatial relationships of assembly and construction. A series of three mounting screws 23 are designed to pass through associated apertures 25 of a top mounting ring 29. The number of screws 23 and the number of apertures 25 may vary, it is believed that three will give an acceptable engagement and force sharing relationship. The top mounting ring 29 has a main planar surface 31, a bevel surface 33 located circumferentially outside the main planar surface 31 and oriented circumferentially outward and upward with respect to the main planar surface 31. Beneath the bevel surface 33 is an abbreviated outer annular surface 37. The abbreviated outer annular surface 37 may be covered by providing a shallow chamfer in the surface into which the solar powered ground light 21 may be installed, so that the outermost part of the bevel surface 33 may be even with, or even very slightly below an upper surface of a material into which the solar powered ground light 21 may be mounted to reduce and interference the stride of a pedestrian if the pedestrian walks over the mounted solar powered ground light 21. Of course, for wall mounting, the exposure of the outer annular surface 37 will not be of concern.

The solar powered ground light 21 top mounting ring 29 has a circumferentially inwardly directed annular surface 39 which meets the main planar surface 31. Below the top mounting ring 29 a lens 41 is shown which will engage the underside of the top mounting ring 29 and may preferably present a main lens surface 81 which may be planar parallel and as coextensive with the main planar surface 31 as is possible. Lens 41 includes a groove 43 having an annular depth preferably matching the inwardly directed annular surface 39 so that the lens 41 main surface is planar parallel and as coextensive with the main planar surface 31 as is possible.

Underneath the lens 41, an o-ring 47, which may be made of silicone, is sued to form a seal between the lens 41 and a base housing 51, that is cup or bowl shaped and seen at the bottom of FIG. 1. The base housing 51 includes an outer rim 53 which lies circumferentially outside a sealing groove 57 which is sized to support, contain and sealingly control and facilitate operation of the o-ring 47 to effect sealing. Outer rim 53 may help in providing a mating face for interfitting underneath the top mounting ring 29 of the solar powered ground light 21.

Underneath the exploded o-ring 47, an inner housing 61 (preferably plastic) is seen. Inside the inner housing 61 a series of LEDs 63 are supported just above a solar panel 67. During solar charging, the presence of the LEDs 63 are not believed to be to any extent significant in blocking or shading the solar panel 67, and this arrangement is believed to be more efficient from a standpoint of receiving light for charging and for orienting the LEDs 63 for light projection from a ground mounted position. Beneath the inner housing 61, a battery 71 that is preferably of maximum capacity and duration for recharging, is seen above a lid 73 that may be secured with mounting screws 77. A tab 79 may be used to insulate the positive terminal of battery 71 from electrically completing the circuit, so as to save battery life after manufacture and before installation of the solar powered ground light 21.

Figure 2:
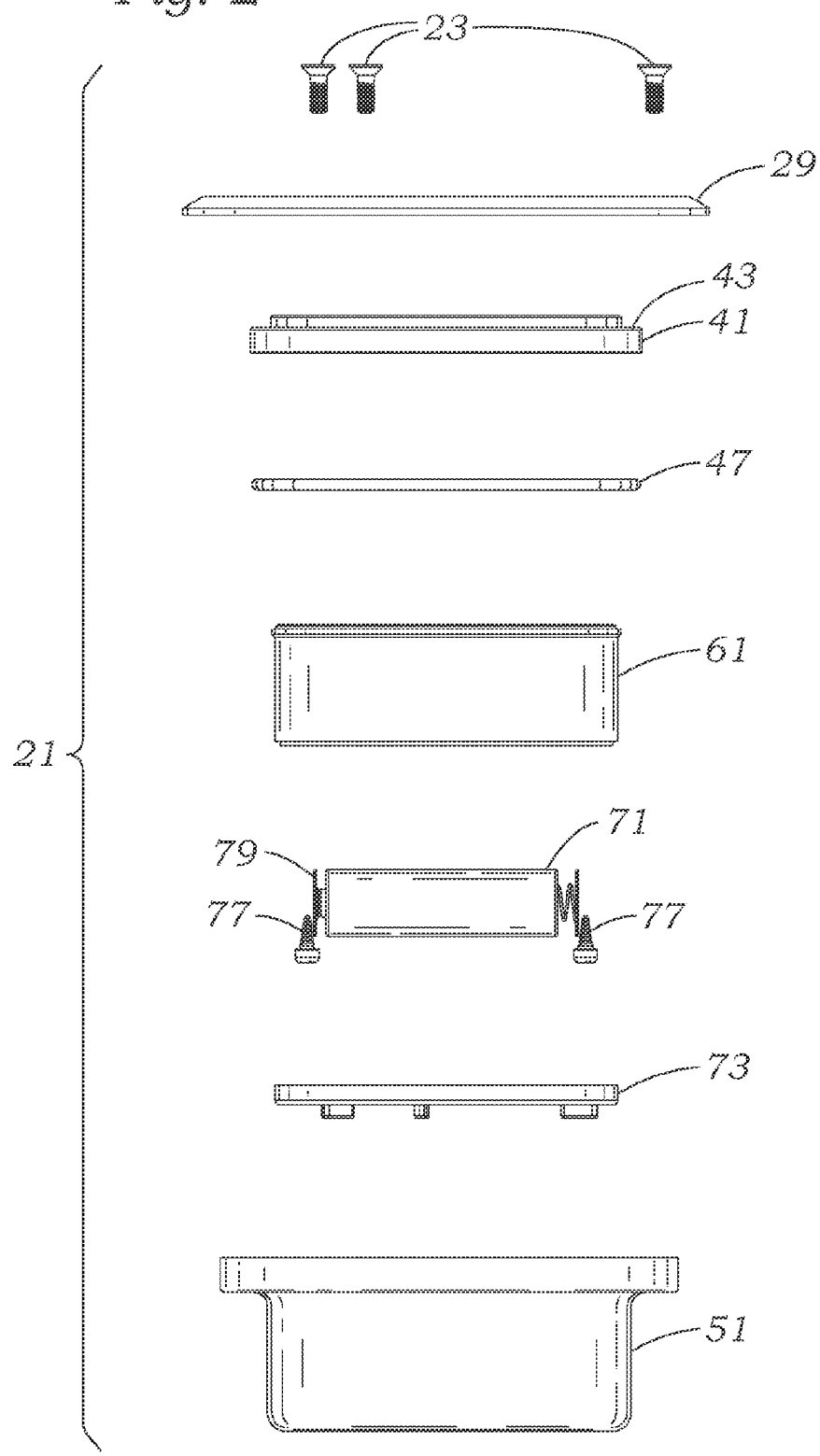
FIG. 2 is a plan exploded side view of the solar powered ground light seen in FIG. 1 and showing further details thereof.

Referring to FIG. 2, a plan vertical exploded view of the general exploded view seen in FIG. 1 further illustrates the orientation and placement of the series of three mounting screws 23, top mounting ring 29, lens 41, groove 43, o-ring 47, inner housing 61, battery 71, lid 73, mounting screws 77, tab 79, and base housing 51. The three mounting screws 23 go through the top mounting ring 29 securing the Lens 41 that is sealed with the o-ring 47 ensuring the solar panel 67 and the LEDs 63 and an internal cavity of the housing 61 and the housing 51 of the Solar powered ground light 21 maintain a watertight seal. The battery 71 is secured in place with the lid 73 that is secured with mounting screws 77. The red tab 79 serves to insulate the positive terminal of the battery 71 from electrically completing the circuit, to save battery 71 life, so the user may remove the red tab 79 prior to putting the Solar powered ground light 21 into service.

Figure 3:
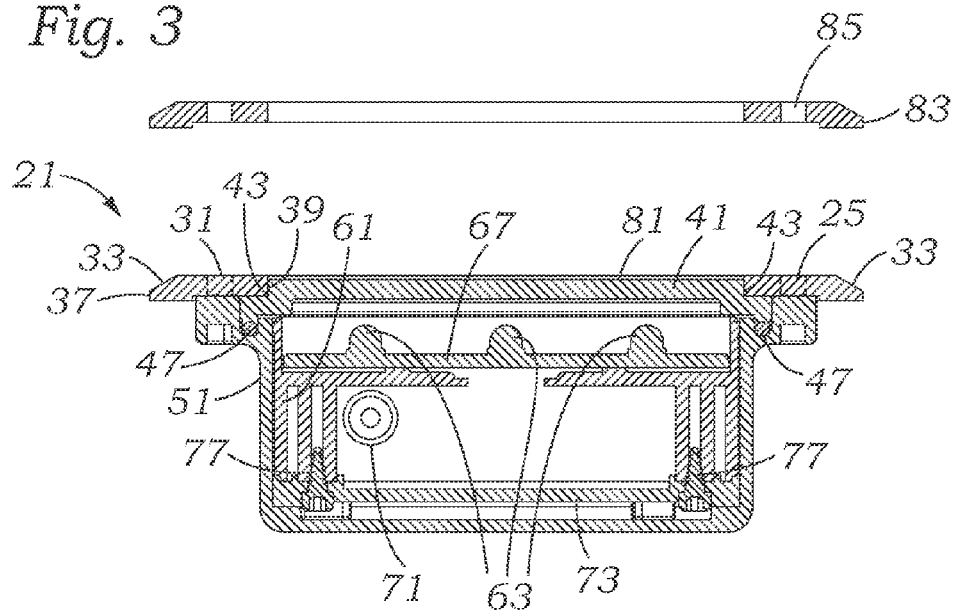
FIG. 3 illustrates a cross sectional side view of the solar powered ground light seen in FIGS. 1 and 2 to further illustrates the mechanical details thereof.

Referring to FIG. 3, a side sectional view illustrates the assembled solar powered ground light 21. The mounting screws 77 are seen as holding the lid 73 in place, with the battery 71 secured within a space formed between the solar panel 67 and the lid 73. It can be seen that the LEDs 63 are upwardly directed and sit atop the solar panel 67. Note that the LEDs can be supported on a very thin support or directly on the solar panel 67. Any shade that the LEDs 63 impress on the solar panel 67 will be de minimis. The o-ring 47 can be seen as acting between an annularly downwardly directed rim on the underside the groove 43, somewhat in the shape of an annular projection, and a sealing groove 57, just outside the main wall of the base housing 51, but inside of the outer rim 53. The lower rim need not actually form an annular projection, and will depend upon the size and depth of the sealing groove 57 and size of the o-ring 47. Since the sealing shown is a straight force compression seal, any annular character of a downwardly available rim is not critical to the sealing capability. Lower circumferential downwardly directed edge of the lens 47 which fits partially into the circumferentially outside the main wall of the base housing 51 sealing groove 57 as it compresses the o-ring 47.

The base housing 51 outer rim 53 can be used in conjunction with the three mounting screws 23 and the apertures 25 in a number of ways. Short mounting screws 23 can be long enough to secure the top mounting ring 29 to the outer rim 53 and no farther where the solar powered ground light 21 needs no further anchoring into a space where it is mounted. Such spaces might include the ground, or a cement mounting where the wetted cement might interact with features on the outside of the base housing 51 to cause it to not be easily removed by vandals. Conversely, in the case of a wood mounting, such as a dock, or deck, blind bore made at a diameter slightly greater than the outermost diameter of the outer rim 53 of the base housing 51 will allow the solar powered ground light 21 to be "dropped in" to the blind bore to begin service. One or two or all three of the three mounting screws 23 could be made longer to pass into a wood material step underneath the outer rim 53 of the base housing 51, or additional mounting apertures could be provided in the solar powered ground light 21, main planar surface 31, or the complete assembled solar powered ground light 21 could be countersunk by the thickness of a retainer ring 83, which could over-fit and lock over all of the top mounting ring 29 and have its own apertures 85 for threaded securing onto a wooden surface. Screws 23 can have different threaded sections to attach the top mounting ring 29 to the base housing 51 outer rim 53 independent of an ability to engage other structures into which the solar powered ground light 21 is mounted.

Figure 4:
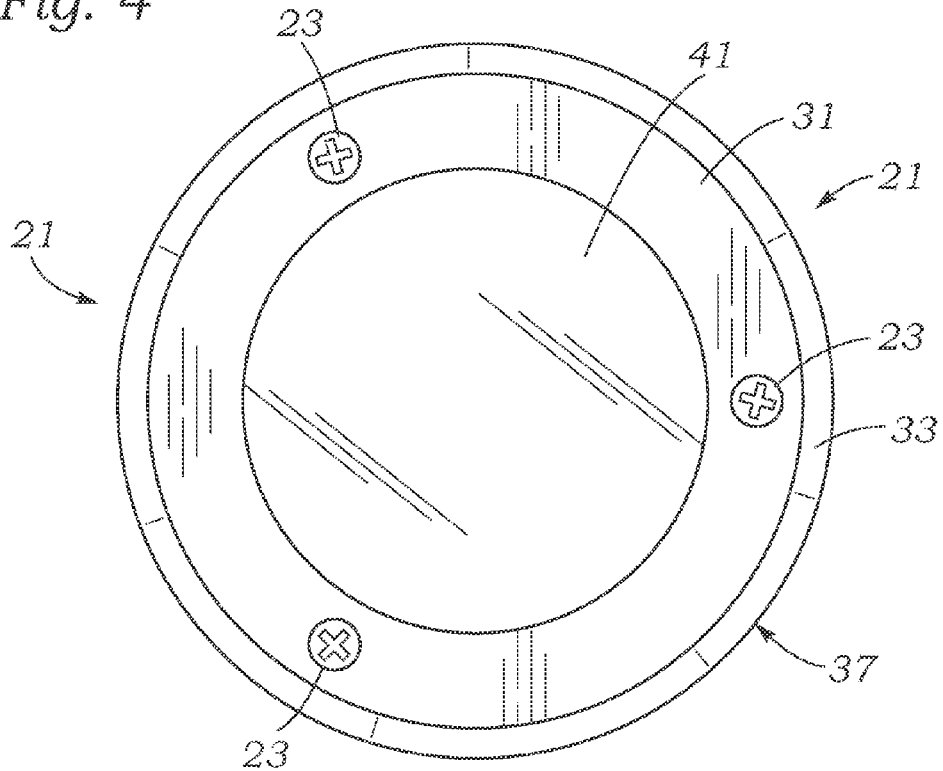
FIG. 4 is a top view of the face plate and lens of the solar powered ground light seen in FIGS. 1-3.

Referring to FIG. 4, a top view of the top mounting ring 29 and lens 47 of the solar powered ground light 21 seen in FIGS. 1-3 is illustrated. The mounting screws 23, main planar surface 31 and bevel surface 33 are seen. Either of these structures can be used along (mounting screws 23) or in conjunction with a retainer ring 83 (for engaging the bevel surface 33 only, or main planar surface 31) where a more tamper proof installation was desired.

Figure 5:
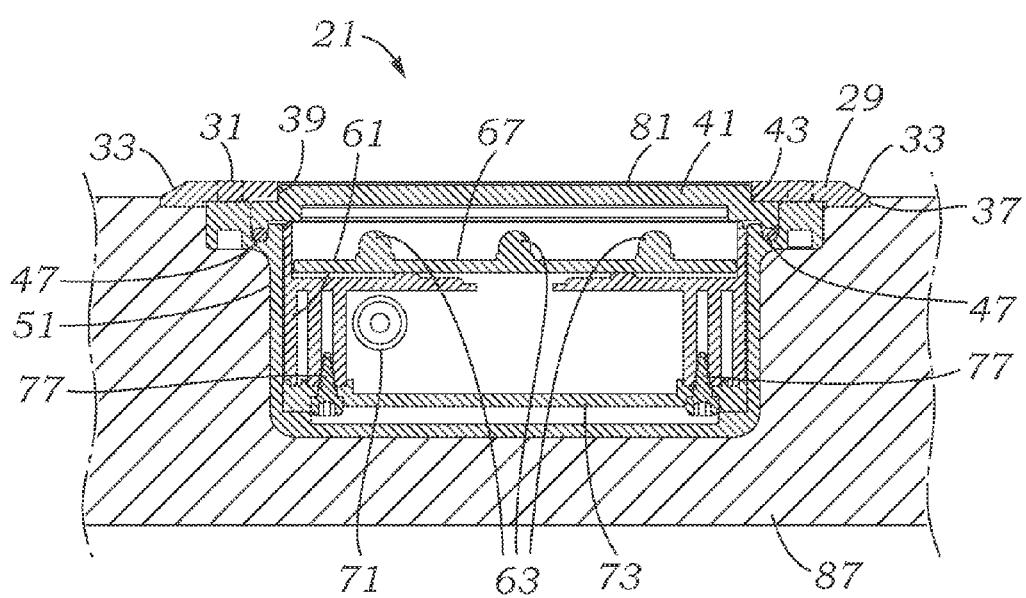
FIG. 5 is a side sectional view of the solar powered ground light seen in FIGS. 1-4 and illustrating the placement of the solar powered ground light into a support structure which may be ground or wall, but may preferably be a wooden dock.

Referring to FIG. 5, a side sectional view of the solar powered ground light 21 seen in FIGS. 1-4 and illustrating its placement of the solar powered ground light into a support structure which may be ground or wall is shown. Here, the abbreviated outer annular surface 37 is seen as being buried into a volumetric material 87, which may preferably be a wooden dock or similar. Note that a series of two chamfer levels and a bottom level may be formed to accommodate the solar powered ground light 21. A first chamfer level might exist below the top mounting ring 29, a second chamfer level might exist below the underneath the outer periphery of the base housing 51, outer rim 53, and a base level might be formed to match the depth of the base housing 51, or a little deeper to leave an ample space (not shown).

As depicted in FIG. 5, the ground level 89 abuts the base of the bevel surface 33. Any foot or shoe sliding in the direction of the solar powered ground light 21 will go slightly up and over. However it can be appreciated that the top mounting ring 29 could be mounted flat on a surface so that the abbreviated outer annular surface 37 might be above the ground surface 89 (especially where the ground surface 89 is on a wall). It can also be appreciated that the top mounting ring 29 main planar surface 31 could be mounted even with the ground surface so that the bevel 33 surface flat on a surface so that the abbreviated outer annular surface 37 might be above the ground surface 89 so that the bevel surface 33 forms a space slightly below the ground surface 89. As such, the bevel surface 33 makes the solar powered ground light 21 forgiving of exact mounting variances.

The cross section of FIG. 5 is based upon the solar powered ground light 21 being mounted in the ground. The relationship of many of the parts described above can be appreciated from this view. The ground surface 89 is shown flush to the top mounting ring 29 but the solar powered ground light 21 may be mounted at any level relative to the ground level or ground surface 89. The top mounting ring 29 securing the Lens 41 that is sealed with the o-ring 47, which may be made of silicone, ensuring the internal cavity of the housing 61 and the base housing 51 of the Solar powered ground light maintain a watertight seal. The plastic lid 73 is shown secured with mounting screws 77. It can be seen from FIG. 5 that the solar powered ground light 21 may be mounted flush to the ground surface 89 to minimize the chances of damage from passers by, gardeners, and the like. The waterproof rating of IP68 that is desired in outdoor applications is attained by utilizing a sealed base housing 51, preferably made from aluminum, that is sealed between the lens 41 with the o-ring 47.

Referring to FIG. 6, a block diagram illustrating one possible realization of the relationship between a communicating solar powered ground light 21 and a wireless connection to the internet as well as a wireless connection to a local controller is seen and illustrating one possible realization of the relationship between a solar powered ground light 21 and a communicating function is shown. The solar powered ground light 21 is shown as having its top mounting ring 29 and base housing 51 enveloping an assembly of SOLAR POWERED GROUND LIGHT ELECTRONICS 109. A wireless connection to the INTERNET 111 as well as a wireless connection to a LOCAL CONTROLLER 115 is shown. Two way communication is indicated by the bi-directional lightening bolts. Communication can be by radio wave, digital wave or light link or any other means of communication.

In the case of the INTERNET 111, a user can control all of the solar powered ground light 21 under a local area network (LAN). The LOCAL CONTROLLER 115 can be either a direct control from a user's LAN system, such as a lap top, or a dedicated hand-held device can be used to perhaps partially control the illuminated solar powered ground light 21 to which the user has control capability. As by example, a landlord or dock lighting controller may have control rights to all solar powered ground light 21 in the harbor. However, a boat owner may be given control, subject to the overriding control of the dock controller, of solar powered ground lights 21 adjacent his dock space.

Referring to FIG. 7, a block diagram illustrating one possible realization of the internal circuitry within the solar powered ground light to include a light controller connected to controlled lights, battery, charging controller and solar panel, and also connected to a photocell, receiver, transmitter, timer and voltage meter, with the voltage meter also being connected to the battery. One possible realization of the internal circuitry within the solar powered ground light 21 and especially SOLAR POWERED GROUND LIGHT ELECTRONICS 109 is shown. SOLAR POWERED GROUND LIGHT ELECTRONICS 109 may include a CONTROLLER 121 which may be referred to as a light controller, and may or may not be connected to EXTERNAL SWITCHES 123. CONTROLLER 121 may be connected to a set of CONTROLLED LIGHTS 127 which may include LEDs 63, the BATTERY 71, a CHARGING CONTROLLER 135 and the SOLAR PANEL 67. In addition, the CONTROLLER 121 may also be connected to a PHOTOCELL 141, a RECEIVER 143, a TRANSMITTER 147, a TIMER 149 AND a VOLTAGE METER 155, with the VOLTAGE METER 155 also being connected to the BATTERY 71.

EXTERNAL SWITCHES 123 can be best realized where they can be sealed against environmental conditions and where the operation by unauthorized persons is not a problem. EXTERNAL SWITCHES 123 may be a slide switch, a magnetically activated switch, or the like. The RECEIVER 143, and TRANSMITTER 147 can be used for communicating any data gathered from any of the CONTROLLER 121, EXTERNAL SWITCHES 123, CONTROLLED LIGHTS 127, BATTERY 71, CHARGING CONTROLLER 135, SOLAR PANEL 61, PHOTOCELL 141, RECEIVER 143, TIMER 149, a CAMERA 153, and VOLTAGE METER 155, and the RECEIVER 143 can communicate instructions to the CONTROLLER 121 to control or query the blocks shown in FIG. 7.

Wireless communications with the solar powered ground light 21 can be via electromagnetic communication including wireless and optic messaging, pager frequencies, telephonic communication by dial tone or digital encoding, or via a computer by jacked or other contact hookup. The solar powered ground light 21 may preferably include an IP68 waterproof rated solar powered center lighting system utilizing LEDs or an EL display with a solar powered battery charging system to support the systems of all of the inventions in this application and may use the PHOTOCELL 141 to turn on and off the CONTROLLED LIGHTS 127 based on the ambient lighting conditions.

The CONTROLLER 121 may be provided that allows a user to turn the CONTROLLED LIGHTS 127 on and off utilizing any input and may provide a change in the color of the light, a blinking function or an emergency signal function. These features may be contained by access to different types of LEDs 63 or within the LEDs 63 and/or other light producing components.

A solar powered ground light 21 system as a "drop in" fixture having a mounting ring 29 and a base housing 51 and an inner housing 61 a solar panel 67 within a lens 41 defines a space for a solar lighting device and battery 21 system where the mounting ring 29 and solar panel 67 and Lens 41 is positioned to emit light from the top opening and is coupled with a top surface of the solar panel 67 so that a light-emitting surface of the solar lighting device is exposed at the opening to provide light.

Referring to FIG. 8, a plan view looking down upon the exterior of a further, second embodiment of a solar powered ground light 201 is seen. Numbering for structures of solar powered ground light 201 that are identical to solar powered ground light 21 will be retained with new numbering for structures shown for the first time in association with solar powered ground light 201. As before, the top mounting ring 29 has a circumferentially inwardly directed annular surface 39 which, in a plan view, defines the upper opening of the top mounting ring 29. As before, lens 41 has a raised portion, including a groove 43 that fits inside the circumferentially inwardly directed annular surface 39 as was seen in FIG. 1. FIG. 8 enables identification through the transparent lens (41 in FIG. 1 but not otherwise identified in FIG. 8 as the object of FIG. 8 is identification of structures observable through the lens is of most interest). Within the opening of the inwardly directed annular surface 39, can be seen new structures, including an organizing support 203 that is seen as having a generally planar member that is shaped to match and may fit partially within inner housing 61. Organizing support 203 supports the solar panel 67 and four LEDs 63. The organizing support 203 may be supported by the inner housing 61, base housing 51, lens 41 or any structure seen or suggested by the Figures.

The solar panel 67 is longer than it is wide, and the four LEDs 63 are arranged so that two are on each side of the solar panel 67 more closely located with respect to longer side edges of the solar panel 67 than the shorter end edges of the solar panel 67. A pair of long walls 205 act to laterally stabilize the solar panel 67 in a direction seen in FIG. 8 as toward or away from each pair of two of the four LEDs 63. Long walls 205 are situated between longer side edges 207 of the solar panel 67 and an area in which the four LEDs 63 are located. Likewise, a pair of short walls 209 act to longitudinally stabilize the solar panel 67 in a direction seen in FIG. 8 as parallel to the pair of long walls 205. Short walls 209 are positioned immediately adjacent shorter side edges 111 of solar panel 67.

Each of the four LEDs 63 have electrical connections below the organizing support 203, and those connections are not shown in FIG. 8 and can be wires, vias, plug connectors any structure that enables electrical connection. A series of access apertures 115 exist, and are partially seen below the LEDs 63 with others not occupied being seen in FIG. 8. Access apertures 115, including the ones that exist below the LEDs 63 may be of any shape which is consistent with their purpose. Although four LEDs 63 are shown, the solar powered ground light 201 may have fewer or more than four. Although eight additional access apertures 115 are shown a greater or smaller number may exist, consistent with the structural demands of the organizing support 203.

All the access apertures 115 can be utilized for any number of variations. They can be used as sight windows for sending and receiving electromagnetic signals, they can be used for light sensor windows for detecting ambient light, such as for a photocell detector, or a thermal transmission window for measuring exterior temperature regardless of the temperature of the internals area of the solar powered ground light 201, to name a few. Especially in the case of more efficient LEDs 63 and more efficient solar panels 67, and improvements in the life and capacity of a rechargeable battery 71 it may be that for a given solar powered ground light 201 that much more light is needed over a much shorter time period.

Especially where remote command communication is possible, management and control of various ones of the solar powered ground light 201 can be allowed to charge over time (and monitor such charging) in advance of an event where greater light is needed say on a certain date with certain hours. The solar powered ground lights 201 located in a certain area can have all their light illuminated over a short period of time after sunset, such has during a business mixer. The solar powered ground lights 201 could then be allowed to return to a usual operating mode or to another needed mode. Modes can be programmed or controlled remotely.

Figure 9:
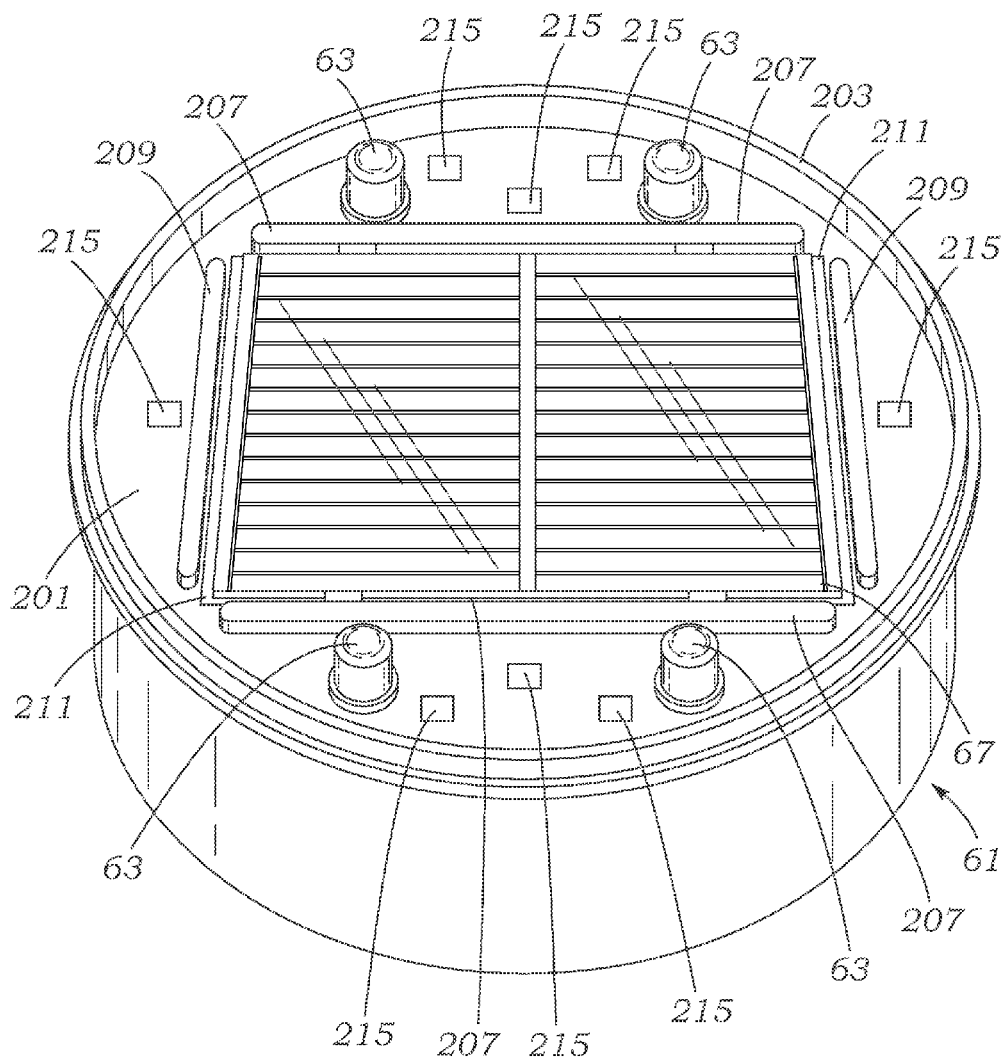
FIG. 9 is a perspective view, from a view point as seen in FIG. 8 but with the top mounting ring and base housing removed, looking down at an angle upon the organizing support within the inner housing.

Referring to FIG. 9, a perspective view, from a view point as seen in FIG. 8 but with the top mounting ring and base housing removed, is a view looking down at an angle upon the organizing support 203 supported partially within the inner housing 61. The three dimensional nature of the long walls 205 and short walls 209 are seen. The LEDs 63 are shown more prominently upwardly located and supported to improve the lateral view factor achievable with the solar powered ground light 201. Note also that electrical connections between the prominent LEDs 63, solar panel 67, and other electronic components are hidden underneath the organizing support 203 and are further protected from exposure to light.

Referring to FIG. 10, a sectional view, from a perspective similar to that seen in FIG. 3, illustrates an organizing support 203 and its vertical relationship to other components. The solar panel 67 is seen as laterally stabilized by pair of long walls 205. A pair of LEDs 63 are seen that are supported and lifted as high as is reasonably possible by the organizing support 203, but as limited by the lens 41. An approximate view factor taken from the view of FIG. 6, which does not necessarily indicate the maximums or minimums possible from different absolute location of the LEDs 63, are shown by a pair of extended lines and angles taken with respect to the LED 63 on the left.

It can be seen that the LED closest to the left side has a minimum viewing angle projecting away from the left side at an angle of about twenty degrees. On the right side, it can be seen that the LED closest to the left side has a minimum viewing angle projecting away from the left side at an angle of about ten degrees. In a solar powered ground light 201, a user can affect the lateral angle of light projection by either pre-specifying the location of the various additional access apertures 215 where LEDs 63 can be mounted, or a user can control which LEDs 63 are illuminated at any given time. A reflector (not shown) can be used between the LED 63 and the inside of the inner housing to help reflect a low angle of incidence light in the opposite direction.

Other structures seen in FIG. 10 include a pair of power input lines 221 connected between a circuit board 219 and the battery 71, with the connection between the solar panel 67 and circuit board 219 being such close of a proximity that its connectivity is difficult to observe. A set of pairs of lead lines 225 connect the circuit board 219 with LEDs 63. The circuit board 219 is preferably mounted directly to the underside of the organizing support 203, such as similar retainer structures 231 or with extruded posts 235 or a combination of both, that can be used to register and hold the circuit board 219. This type of configuration that includes the circuit board 219, solar panel 67 and LEDs 63 combined and attached to organizing support 203 can facilitate assembly by leaving as a last step the connection of the circuit board 219 to the battery 71.

A preferred embodiment of the waterproof solar powered ground lights 21 and 101 provide for a system having component parts thereof fabricated out of aluminum, although other materials may be utilized, such as die cast aluminum, cast iron, brass, stainless steel, as well as a high strength injection moldable plastic such as Nylon with a fiberglass fill element. It is also preferred to use mounting screws 23 to be of sufficient length to mount to nearly any surface securely.

A preferred embodiment of the solar powered ground lights 21 and 101 is shown in FIGS. 1 through 10 and is of the type that may be attached to nearly any surface, horizontal, vertical, above ground, or under water. Further, from the discussions above it can be appreciated that the Solar powered ground lights would be beneficial in a waterfront application. As such, the embodiment disclosed in Figures of this application, further disclose a waterproof solar powered ground lights 21 and/or 201 that may feature a PHOTOCELL 141 that may turn the waterproof solar powered ground light 21 on and off based on ambient conditions. Other control has been illustrated that allows a user to turn the waterproof solar powered ground light 21 and/or 201 on and off utilizing a slide switch, a magnetically activated switch, the internet or a local controller or the like, to change the color of the light, to invoke a blinking function or to invoke an emergency signal function.

It is contemplated that any optional feature of the inventive variations described may be set forth and claimed independently, or in combination with any one or more of the features described herein. Reference to a singular item, includes the possibility that there is a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the to be appended claims. It is further noted that the to be appended claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the to be appended claims shall allow for the inclusion of any additional element irrespective of whether a given number of elements are enumerated in the to be appended claim, or the addition of a feature could be regarded as transforming the nature of an element set forth in the to be appended claims. Except as specifically defined herein, all technical and scientific terms used herein are to be given as broad a commonly understood meaning as possible while maintaining to be appended claim validity. The breadth of the present invention is not to be limited to the examples provided and/or the subject specification, but rather only by the scope of the to be appended claim language. Use of the term "invention" herein is not intended to limit the scope of the to be appended claims in any manner. Rather it should be recognized that the "invention" includes the many variations explicitly or implicitly described herein, including those variations that would be obvious to one of ordinary skill in the art upon reading the present specification. Further, it is not intended that any section of this specification (e.g., the Summary, Detailed Description, Abstract, Field of the Invention, etc.) be accorded special significance in describing the invention relative to another or the to be appended claims. All references cited are incorporated by reference in their entirety. Although the foregoing invention has been described in detail for purposes of clarity of understanding, it is contemplated that certain modifications may be practiced within the scope of the to be appended claims.

Although the invention has been derived with reference to particular illustrative embodiments thereof, many invention changes and modifications may become apparent to those skilled in the art without departing from the broad spirit and scope of the invention. Therefore, included within the patent warranted hereon are all such changes and modifications reasonably and properly be included within the scope of this contribution to the art.

What is claimed:

1. A solar powered ground light further comprising:
   a base housing having an upwardly disposed groove;
   a lens, having a lower rim for being received in the groove of the base housing to sealably attach the lens to the base housing;
   top mounting ring having a central opening for engaging the lens and for attachment to the base housing;
   an inner housing, within the base housing;
   an organizing support supported by the inner housing and having at least two walls projecting upwardly from the organizing support;
   an LED mounted atop the organizing support and adjacent the lens;
   a solar panel mounted atop and laterally stabilized and secured by the walls projecting upwardly from the organizing support;
   a circuit board underneath the organizing support;
   a battery carried within the base housing and operably connected to the LED through connection to the circuit board for controllably powering the LED, the battery operably connected to the solar panel for charging the battery; the base housing and lens to form a waterproof envelope for the inner housing, with the organizing support, LED, battery and solar panel.

2. The solar powered ground light as recited in claim 1 and further comprising a compressible o-ring located within the upwardly disposed groove of the base housing and the lower rim of the lens.

3. The solar powered ground light as recited in claim 1 and wherein the battery is also carried within the inner housing.

4. The solar powered ground light as recited in claim 1 and wherein the LED is connected to the circuit board through at least one opening in the organizing support.

5. The solar powered ground light as recited in claim 4 and wherein the organizing support includes a plurality of openings and wherein the organizing support supports a plurality of LEDs and wherein the plurality of openings of the organizing support is greater than the plurality of LEDs.

6. The solar powered ground light as recited in claim 1 wherein the circuit board is attached to the organizing support.

7. The solar powered illuminated ground light as recited in claim 1 and wherein the solar powered modular structure further comprises a photocell connected to enable illumination of the LED contained within the envelope when ambient light falls below a predetermined threshold.

8. The solar powered illuminated ground light as recited in claim 1 and further comprising a controller operably connected to the battery and operably connected to the LED contained within the waterproof envelope to control illumination of the LED.

9. The solar powered illuminated ground light as recited in claim 8 and further comprising a transmitter and receiver operably connected to the battery and operably connected to the at least one light source contained within the waterproof envelope to control the at least one light source contained within the waterproof envelope.

10. The solar powered illuminated ground light as recited in claim 1 and further comprising a voltage meter operably connected to the battery and operably connected to the controller contained within the waterproof envelope to enable control of the at least one light source contained within the envelope based upon a voltage level of the battery.

* * * * *